US011995721B1

(12) United States Patent
Crampton

(10) Patent No.: US 11,995,721 B1
(45) Date of Patent: May 28, 2024

(54) HYBRID EXCHANGE PLATFORM

(71) Applicant: Cboe Exchange, Inc., Chicago, IL (US)

(72) Inventor: Eric Crampton, Overland Park, KS (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

(21) Appl. No.: 17/400,884

(22) Filed: Aug. 12, 2021

Related U.S. Application Data

(60) Provisional application No. 63/064,738, filed on Aug. 12, 2020.

(51) Int. Cl.
*G06Q 40/00* (2023.01)
*G06Q 40/04* (2012.01)
*H04L 12/46* (2006.01)

(52) U.S. Cl.
CPC ......... *G06Q 40/04* (2013.01); *H04L 12/4641* (2013.01)

(58) Field of Classification Search
CPC ............................ G06Q 40/04; H04L 12/4641
See application file for complete search history.

(56) References Cited

U.S. PATENT DOCUMENTS

| 7,552,083 B2* | 6/2009 | Carone | G06Q 30/08 705/37 |
| 8,175,958 B2* | 5/2012 | Smith | G06Q 40/04 705/37 |
| 2006/0080196 A1* | 4/2006 | Griffin | G06Q 40/00 705/35 |
| 2006/0167789 A1* | 7/2006 | Tilly | G06Q 40/04 705/37 |
| 2008/0313095 A1* | 12/2008 | Shalen | G06Q 40/06 705/37 |
| 2009/0204534 A1* | 8/2009 | Tilly | G06Q 30/08 705/37 |
| 2017/0243289 A1* | 8/2017 | Rufo | G06Q 40/04 |

* cited by examiner

*Primary Examiner* — Rajesh Khattar
(74) *Attorney, Agent, or Firm* — Fish & Richardson P.C.

(57) ABSTRACT

Systems and techniques are disclosed for an exchange platform that runs a hybrid market model combining electronic trading and open outcry trading. In some implementations, a secure connection is established with each of a plurality of market participants associated with a trading floor. A transaction order for a financial instrument is received from a connected device. The transaction order includes a routing instruction for routing the transaction order to the trading floor. A market participant to which the transaction order is to be routed is identified. The transaction order is routed to the market participant. Information that one or more in-crowd market participants have accepted the transaction order is received. The transaction order is facilitated based on the information that the one or more in-crowd market participants have accepted the transaction order.

20 Claims, 4 Drawing Sheets

400

```
┌─────────────────────────────────────────────────────────────┐
│ ESTABLISH A SECURE CONNECTION WITH EACH OF A PLURALITY OF   │
│ MARKET PARTICIPANTS                                         │
│                                                         410 │
└─────────────────────────────────────────────────────────────┘
                              │
                              ▼
┌─────────────────────────────────────────────────────────────┐
│ RECEIVE A TRANSACTION ORDER FOR A FINANCIAL INSTRUMENT      │
│                                                         420 │
└─────────────────────────────────────────────────────────────┘
                              │
                              ▼
┌─────────────────────────────────────────────────────────────┐
│ IDENTIFY A MARKET PARTICIPANT TO WHICH THE TRANSACTION      │
│ ORDER IS TO BE ROUTED                                       │
│                                                         430 │
└─────────────────────────────────────────────────────────────┘
                              │
                              ▼
┌─────────────────────────────────────────────────────────────┐
│ ROUTE THE TRANSACTION ORDER TO THE MARKET PARTICIPANT       │
│                                                         440 │
└─────────────────────────────────────────────────────────────┘
                              │
                              ▼
┌─────────────────────────────────────────────────────────────┐
│ RECEIVE INFORMATION THAT ONE OR MORE IN-CROWD MARKET        │
│ PARTICIPANTS HAVE ACCEPTED THE TRANSACTION ORDER            │
│                                                         450 │
└─────────────────────────────────────────────────────────────┘
                              │
                              ▼
┌─────────────────────────────────────────────────────────────┐
│ FACILITATE THE TRANSACTION ORDER                            │
│                                                         460 │
└─────────────────────────────────────────────────────────────┘
```

FIG. 4

HYBRID EXCHANGE PLATFORM

CROSS-REFERENCE TO RELATED APPLICATION

This application claims the benefit of U.S. Provisional Patent Application No. 63/064,738, filed Aug. 12, 2020, which is incorporated herein by reference in its entirety.

TECHNICAL FIELD

This application relates to technology for trading financial instruments in electronic exchanges, including exchanges that combine electronic and open-outcry trading mechanisms.

BACKGROUND

High volumes of financial instruments such as derivatives, stocks, and bonds are continuously traded at electronic exchanges, which enable trades to occur in real time through the algorithmic processing of orders and associated market information. Generally, order execution refers to a process of accepting and completing an order for a financial instrument (e.g., buy order, sell order) that is received by an exchange. Market participants typically price their bids and offers based on market conditions, which are subject to rapid change, and electronic exchanges often match bids and offers based on price-time priority, and the principle of first-in, first-out (FIFO) (also known as first-come-first-served (FCFS)). Order execution occurs when the order is filled, and not necessarily when the account holder places the order. A trade may, for example, be executed when the price associated with a bid to purchase a financial instrument matches the price associated with an offer to sell the same instrument.

SUMMARY

The disclosure that follows relates to a hybrid exchange platform implemented via an exchange computer system. The platform runs a hybrid market model that combines the benefits of electronic trading with those of open outcry trading. In some implementations, the hybrid exchange platform is configured as an options exchange. The exchange platform can be configured to provide various functionality associated with trading, such as order routing (including market interactions), trade execution, matching, and reporting, market data delivery to the trading floor (e.g., overhead data displays), and trading floor presentation and management applications for different types of market participants (e.g., brokers, market makers).

Among other advantages, the hybrid exchange platform provides the technology, information, and mechanisms necessary to facilitate both electronic trading and open outcry trading. The hybrid exchange platform includes floor systems that permit the in-person matching of buyers and sellers on a physical trading floor. The hybrid exchange platform also includes a trading system with a matching engine that permits the routing of transaction orders from remote market participants, both amongst and between themselves, and to participants on the physical trading floor. For example, through infrastructure provided by the hybrid exchange platform, a broker or dealer can remotely interact with one or more in-crowd market makers on the trading floor.

In one aspect, a method for trading implemented via an exchange computer system includes establishing a secure connection with each of a plurality of market participants associated with a trading floor. The method includes receiving, from a connected user device, a transaction order for a financial instrument, wherein the transaction order comprises a routing instruction for routing the transaction order to the trading floor. The method includes identifying, from among the plurality of market participants and based on the routing instruction, a market participant to which the transaction order is to be routed. The method includes routing the transaction order to the market participant. The method includes receiving information that one or more in-crowd market participants have accepted the transaction order. The method also includes facilitating the transaction order based on the information that the one or more in-crowd market participants have accepted the transaction order.

The details of one or more embodiments of the subject matter described in this specification are set forth in the accompanying drawings and the description below. Other potential aspects, features, and advantages will be apparent from the description, the drawings, and the claims.

BRIEF DESCRIPTION OF THE DRAWINGS

FIG. 4 is a flowchart of an example process for implementing a hybrid exchange platform.

DETAILED DESCRIPTION

A. System Overview

Figure 1:
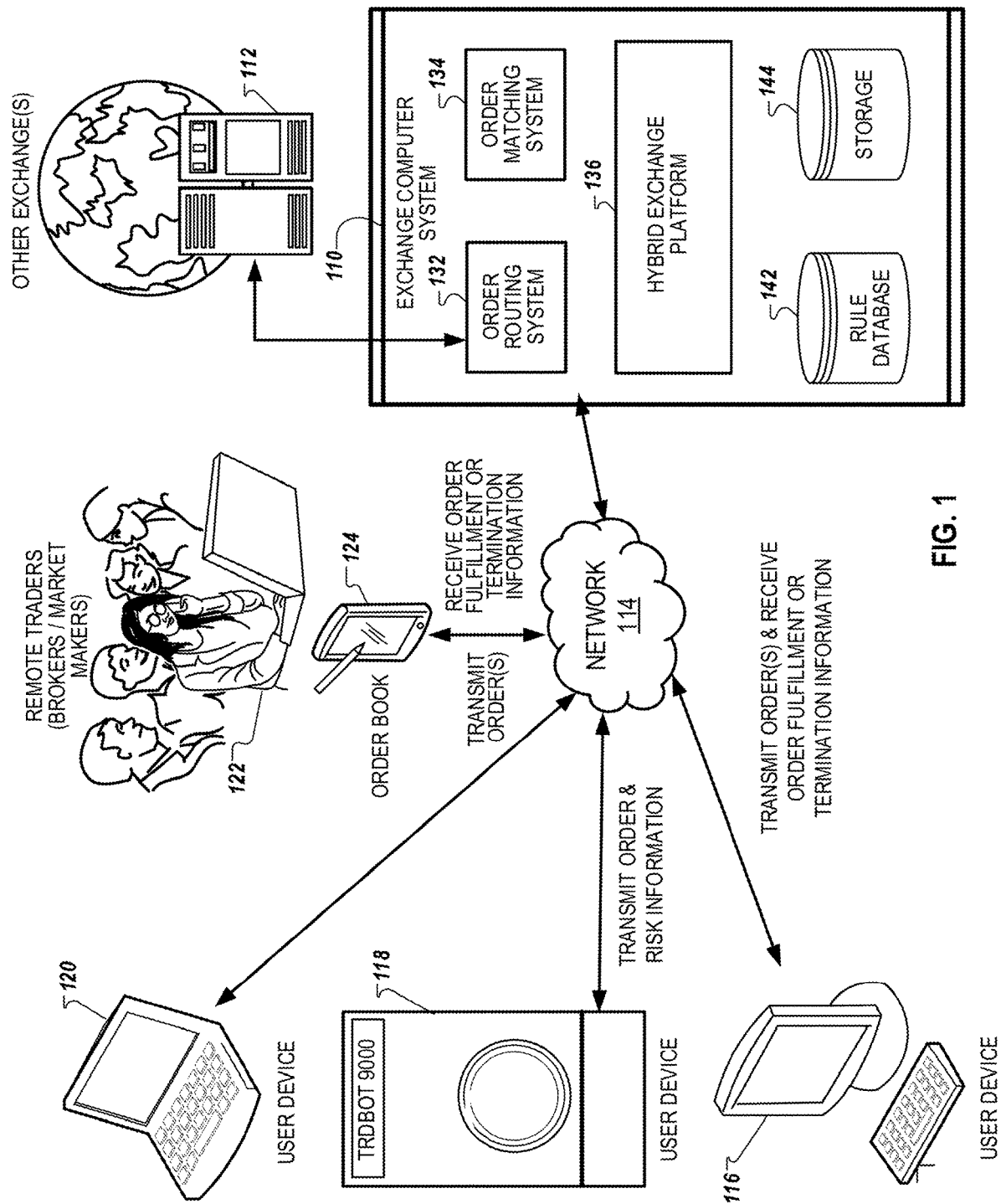
FIG. 1 is a diagram of an example of an exchange computer system that implements a hybrid trading platform, and the associated networks, devices, and users that make up an exemplary trading environment in which that system operates.

FIG. 1 is a diagram of an example of an exchange computer system that facilitates the placement and execution of user-customized orders, and the associated networks, devices, and users that make up an exemplary trading environment in which that system operates. Generally, the term "user" can refer to any entity that interacts with the exchange computer system and/or associated networks and devices. Users can include, for example, market makers and other market participants, brokers, institutional traders, individual traders, and automated trading systems. The diagram includes an exchange computer system 110, other exchanges 112, a network 114, user devices 116, 118, 120, market makers/brokers 122, and electronic order book 124.

The exchange computer system 110 can be implemented in a fully electronic manner. The exchange computer system 110 can receive orders from remote electronic devices. The financial instruments can include securities such as stocks, options, futures, or other derivatives associated with an underlying asset.

Network 114 can connect various components within the trading environment, and is configured to facilitate communications between those components. Network 114 can, for example, be configured to enable the exchange of electronic communications that include order and order fulfillment information between connected devices, such as an electronic order book 124 and the exchange computer system 110.

Network 114 can include one or more networks or sub-networks, each of which can include a wired or wireless data pathway. Network 114 can, for example, include one or more of the Internet, Wide Area Networks (WANs), Local Area Networks (LANs), or other packet-switched or circuit-switched data networks that are capable of carrying electronic communications (e.g., data or voice communications).

In some implementations, the network 114 can include a communications network inclusive of hardware and software implemented on various systems, devices, and components connected to network 114. In some implementations, trader information, such as a trader's speech and actions, can be recorded by a user device (e.g., a computer or portable device such as a cellular phone) at the location of the trader using sensors, cameras and microphones, and can be continuously transmitted across the network 114 to other devices connected to the network 114.

A broker may execute an order based on a choice of markets. For example, for a stock that is listed on an exchange, a broker may direct the order to that exchange, to another exchange, or to a "market maker" who stands ready to buy or sell a stock listed on the exchange at publicly quoted prices. As another example, for a stock that trades in an over-the-counter (OTC) market, a broker may send the order to an "OTC market maker." In some instances, such as when a limit order is placed, a broker may route the order to an electronic communications network (ECN) that automatically matches buy and sell orders at specified prices. A broker may also "internalize" an order upon receipt, where the order is sent to another division of the broker's firm to be filled out of the firm's own inventory.

To protect communications between the various systems, devices, and components connected to network 114, network 114 can implement security protocols and measures such that data identifying order or bid information, or parties placing orders or quotes, can be securely transmitted. Network 114 can, for example, include virtual private networks (VPNs) or other networks that enable secure connections to be established with exchange computer system 110.

User devices 116, 118, and 120 can include portable or stationary electronic devices, such as smartphones, tablets, laptops, desktops, and servers that include user interfaces to display information and receive user input, and that are configured to communicate over a computer network. User devices 116, 118, and 120 can communicate with the exchange computer system 110 over network 114 using a proprietary protocol, or a message-based protocol such as financial information exchange (FIX), implemented over TCP/IP.

In some implementations, user devices 116, 118, and 120 can include displays for displaying representations of a trading platform. For example, the user devices 116, 118, and 120 can include or be coupled to graphical displays that include computer monitors. The user devices 116, 118, and 120 can include or be coupled to graphics engines and processors for processing high volumes of data to render information in real time.

User devices 116, 118, and 120 can transmit user input such as order information or risk information to the exchange computer system 110, and can also receive data from the exchange computer system 110 indicating that an order has been filled or canceled.

Users such as market makers/brokers 122 can also place orders and receive information about order fulfillment or termination through electronic order book 124, which may include a record of outstanding public customer limit orders that can be matched against future incoming orders.

The exchange computer system 110 includes an order routing system (ORS) 132, an order matching system (OMS) 134, a hybrid exchange platform 136, a database 142 of trading rules and algorithms, and storage 144. In some implementations, the exchange computer system 110 is a distributed computer system.

The order routing system (ORS) 132 determines whether a received order or quote is to be executed at the exchange computer system 110, or should instead be redirected to another exchange 112, and includes processing systems that enable the management of high data volumes. The ORS 132 can, for example, receive order or quote information for the purchase or sale of financial instruments from one or more user devices 116, 118, and 120.

Upon receiving an order or quote the ORS 132 determines if the destination specified in the received order or quote is the exchange computer system 110. If the exchange computer system 110 is not the destination, the ORS 132 forwards the order or quote to another exchange 112, which can be either the destination exchange, or an exchange en route to the destination exchange.

If the ORS 132 determines that the exchange computer system 110 is the destination of the received order or quote, the ORS 132 can forward the received order or quote to a matching system (OMS) 134.

The OMS 134 includes processing systems that analyze and manipulate orders according to matching rules stored in the database 142. The OMS 134 can also include an electronic book (EBOOK) of orders and quotes with which incoming orders to buy or sell are matched, according to the matching rules. The EBOOK can also be implemented in a separate database such as storage 144, which can include multiple mass storage memory devices for the storage of order and quote information. When the OMS 134 determines that a match exists for an order (for example, when a bid matches an offer for sale), the OMS 134 can mark the matched order or quote with a broker-specific identifier so that the broker sending the order or quote information can be identified.

Orders matched by OMS 134 can for example, originate from within a trading environment by the exchange computer system 110, from other components of the exchange computer system 110, and/or from systems that are connected to the exchange computer system 110.

Storage 144 and database 142 store and handle data in a manner that satisfies the privacy and security requirements of the exchange computer system 110 and its users, and can store one or more of telemetric data, user profiles, user history, and rules and algorithms for matching quotes, bids, and orders. Database 142 can store data that specifies the rules by which the exchange computer system 110 can operate, The OMS 134 matches the buy side and sell side of a trade, and forwards the matched trade to a third party organization that verifies the proper clearance of the trade, such as the Options Clearing Corporation (OCC) where the securities can be options, or Depository Trust Company (DTC) where the securities can be equities. The OMS 134 can also format the quote and sale update information and send that information through an internal distribution system that refreshes displays, in addition to submitting the information to a quote and trade dissemination service such as, in the case of options, the Options Price Reporting Authority (OPRA). In the case of Equities, the information would be submitted to the Securities Information Processor (SIP). Upon completion of a trade, fill information for an order may also be passed through the OMS 134 and the ORS 132 to one or more user devices 116, 118, and 120.

B. Exchange Floor Systems a. Terminology

Terms identified herein are discussed are referenced throughout.

Stream markets indices (SMi) refer to multicast market dissemination technologies used by an index platform environment to publish data.

Customer orders refer to orders having one of a specific set of "Order Capacity" values. Expected value designations are "C" (Customer) and "U" (Professional Customer). A customer size is afforded a number of considerations in floor trading.

A "data wall" refers to large overhead displays of market data on the trading floor, and the systems for managing these displays.

A "floor data market aggregator" (FDMA) process refers to one that manages floor data subscriptions and market data distribution for the Floor.

A "floor data master" (FDM) refers a component (one per matching engine) whose purpose is to provide the floor FDMA with a unit's worth of subscribed data.

A "floor trade report" (FTR) refers to a core message for reporting executions from the trading floor. These may be by market makers via FIX (e.g., MM floor trade report), Broker/dealers via PAR 3.0 (BD floor trade report), or by broker/dealers leveraging Names Later feature (NL floor trade report).

An "index platform environment" (IPE) refers to a platform that calculates and manages index values for the hybrid exchange platform disclosed throughout. The IPE disseminates calculated indices via CSMi.

A "market data master" (MDM) is a component (one per matching engine) that is fed data by ME, such as feeds, pitch, top, etc.

A "matching engine" (ME), which is sometimes used as "units" are used to match transaction orders.

A "multicast TOP" (mTOP) refers to top of book (inside quote) and last sale information communicated as a multicast UDP feed. TCP gap recovery features are also provided.

PAR refers to a platform with which floor brokers interact with the electronic markets. Orders routed to the floor will be managed on devices presenting PAR workstations. In some instances, PAR modernizes the floor order management systems. In some other instances, the PAR is compatible with various technologies associated with the hybrid exchange platform, such as Bats technology.

b. Open Outcry Trading

As described throughout, the hybrid exchange platform 136 is configured to run a hybrid market model that combines benefits of electronic trading with those of open outcry trading. Floor systems associated with the platform provide the technology, information, and mechanisms necessary to facilitate open outcry trading. Open outcry trading is the mechanism used to describe the matching of buyers and sellers through the use of verbal bids and offers. Open outcry price discovery is the process by which brokers representing customer (or firm orders) receive indications of interest of market makers (Liquidity providers) for a specific financial instrument or series of financial instruments. Supply and Demand can determine the value of a financial instrument and or the size of the liquidity available When market participants enter very large or very complicated (i.e. large number of legs, irregular leg ratios), they often prefer to use open outcry trading for professional "high touch" handling of such orders. Liquidity providers will often times provide significantly deeper and tighter quotes for open outcry orders as compared to electronic dissemination of the same quote. Liquidity providers are able to assess risk factors independently of an electronic system.

In-person negotiated trading can lead to legitimate transactions that would appear to be irregular or incorrect if they were to occur on an electronic trading platform. For example, based on verbal input, complex orders may be traded out of ratio, an order may be traded through its limit price, and a trade may be reported (i.e. printed to tape) before reporting the contra parties to the trades. All of these activities can be legitimate since the input via phone calls, direct verbal and visual communication, and other non-systematized communications are facilitating these executions.

c. Order Routing to Floor

All orders routed to floor include an explicit routing instruction to do so. The instruction includes various features. For instance, a floor routing instruction (e.g., direct, default, electronic only) can be used to route a transaction order to a trading floor. Direct routing instructs that a transaction order to be directed to an indicated device. Default routing (also referred to as "Electronic First") indicates that electronic execution is preferred, but the order may be routed to the indicated device if it cannot be processed. A value of a "ElectronicOnly" tag indicates that the order should be handled as electronic only, i.e., the order will not be evaluated for routing to the floor. The absence of a "FloorRoutingInst" tag will cause the port default to be applied. A portfolio default may be set to "Default" or "Electronic Only".

The floor destination can be either a specific Public Automated Routing workstation (PAR), which is a labelled destination on the trading floor, usually associated with a broker or a PAR official. This can indicate that the order will be routed a PAR official's workstation for the order's instrument, if one is available. The reserved floor route destination can be configured to route to a particular PAR official's workstation. A port setting can also designate a default destination PAR.

The trading floor can provide operations to floor traders whereby the order is temporarily routed to the participants to execute against the local book and/or away markets. When the order is routed from the trading floor to participants for these operations, after executing the instruction, the participant is required to route any remaining size back to the PAR. Orders are routable to the designated floor workstation even if the workstation does not have a broker logged in the order will "queue" for that workstation. Orders are routable to the designated floor workstation regardless of the symbol state. If the order type is not supported by floor systems and is attempted to route there, the order will be cancelled back to the firm. If a workstation identified in an order is not known by floor systems, the order will be cancelled back to the client. This includes any route to the default PAR for a symbol which has no default PAR.

d. Default Order Routing To Floor

If an order has instructions to route to the floor as a default, the hybrid exchange platform 136 may route the order to the floor if the order and/or characteristics do not allow for it to be processed electronically. If the ME cannot accept the order, it will be either rejected/cancelled back to the firm or routed to the Floor.

e. Order Cancel and Order Modify Routing to Floor

Cancel requests received or originated for orders located on the floor will be immediately marked as "cancel pending" and forwarded to the floor systems.

A PAR Broker may also cancel any order they have on their workstation in whole or in part. In such instances, a cancel report will be sent from the floor to the ME, where the cancellation will be processed. When the cancel is processed by floor systems, a cancel report will be sent to the ME for the cancelled size. If the ME receives a cancel request while processing a trading operation on behalf of the floor, such as sweep or complex auction, the order will be marked as "pending cancellation" and a cancel request will be sent to the floor.

It is possible that not all of the size of the order was routed for the ME operation. The floor can be responsible for executing the cancellation. Trade with Book and Trade with All operations are atomic in the ME. A cancel request cannot be received during such operations.

The floor will check for a pending cancellation on the order when any remaining size is returned to the floor. If the ME receives a Sweep, COA, T/A, or T/B request from the Floor and the order is marked as 'cancel pending', the request will be rejected back to the Floor. Sweep, COA, T/A, and T/B operations will not be made available on the PAR UI if the PAR is aware of a cancel pending.

The floor may receive the cancel request when it does not control all of the order size since the order may have been returned to the ME to trade, cancel, book, etc., while the cancel was being routed to Floor Systems. In this case the cancel request will be ignored by the floor. The ME will have marked the order as "pending cancel" before sending the cancel request to the Floor. In such cases, the ME will handle messages from the floor. For example, the ME will reject T/A, T/B, COA, Sweep requests with a "pending cancel" reason, which the Floor can in turn process as a cancel request. The ME will then accept trade reports for the order even if it marked 'pending cancel'. The ME will accept a cancel, in whole or in part, from the floor (the fact that the order may have been marked pending cancel is irrelevant). The ME will accept a Book request from the Floor, immediately cancelling the order if it has been marked "pending cancel." During the processing of a T/A, T/B, COA, or Sweep operation, self-trade prevention cancellation of the Floor's order will not be triggered. Mass cancel and order purge operations will cause cancel requests for any affected orders to be routed to the floor. Cancel on Disconnect and ME Cancel on Disconnect will NOT trigger cancel requests to the routed to the floor. After markets close, the floor systems will ensure that there are no orders in an "open ticket" state, so that end of day order cancellation will be able to be processed without any delays due to PAR processes.

f. Names Later

"Names Later" (NL) is a floor trading process whereby a broker may report a trade prior to having allocated contra parties, in order to satisfy the SEC 90-second trade reporting requirement. Under NL, the full size of the execution will be eligible to print to tape but one or more individual trade matches constituting the reported size will subsequently be reported.

It is important to be aware that the contra parties will be independently reporting the execution, and such reports may be received before or after the Broker's NL execution. The contra party on a match may be a market marker reporting via FIX or another Broker executing an order (who may or may not be matching to their own NL execution).

g. Printing, Reporting, and Matching Floor Executions

Executions on the trading floor are submitted to the hybrid exchange platform via floor trade report messages. These are submitted to the hybrid exchange platform either by floor broker/dealers via PAR as trade reports on behalf of orders they have had routed to them, or by floor Market Makers via a FIX message (a custom "Add Trade Report" message). Both parties to a trade will independently report their version of the trade. The hybrid exchange platform will use these reports to appropriately match contra parties.

A typical floor trade match has three types of participants to process: (1) the EFID who entered the order that routed to the PAR for execution, (2) the BD who executed the order, and (3) the MMs and BDs who traded with the BD. A less common floor match involves MM to MM trades (two participants trading without a broker or order being involved).

As trade reports are received from PAR and from FIX, execution reports will be delivered to the EFID/port that originally entered the order, the BD that executed the order (delivered to any eligible drop ports the BD has configured), the he MMs who traded with the BD (if immediately matched), and all eligible drop copy recipients.

The trade reports will also be used to determine matches for clearing, and printing trades to the market feeds. Unlike electronic matching and execution, each of these three results may occur at different times.

A complication to the processing of floor trade reports is the provisioning of the NL feature on the PAR system which allows floor broker/dealers to report a trade without including the contra party information. If the hybrid exchange platform accepts the NL trade report, the trade will be printed to the tape. The broker/dealer is then required to report the contra party information before the close of floor trading for the day. Firms having floor brokers will be able to have a drop copy port configured to receive drops of any executions to which the executing broker is a party.

h. Trade Flow on Exchange Floor

Figure 2:
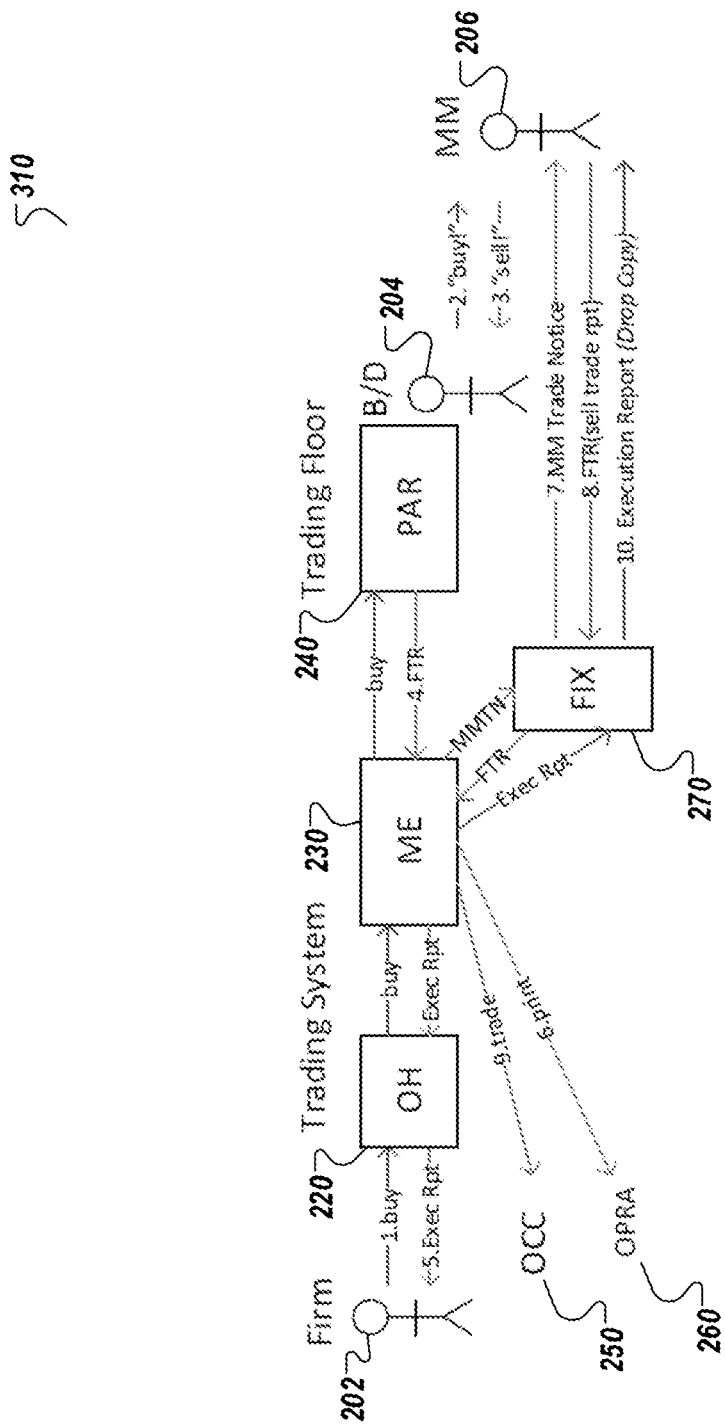
FIG. 2 is a diagram of an example of a trade flow on an exchange floor of the hybrid exchange platform.

FIG. 2 is a diagram of an example of a trade flow on an exchange floor of the hybrid exchange platform. In the example, a firm 202 places orders on behalf of clients using a trading system. The trading system includes OH 220 and a matching engine (ME) 230 for processing transaction orders. In the example shown in FIG. 2, broker 202 places a buy order for a financial instrument on OH 220 with a routing instruction that is used by the trading system to route the buy order to the trading floor.

A broker/dealer (B/D) 204 interacts with one or more in-crowd market makers (MM) 206 on the trading floor. The business flow (not including book interactions, such as T/A, T/B, is shown in FIG. 2. An order entered having floor route instructions, and is routed to B/D 204 on the floor (e.g., on PAR Workstation). In this example, B/D 204 represents the order to the crowd (verbally calling the order terms out to the crowd). One or more in-crowd MM 206 verbally agree to trade some or all of the order size.

B/D 204 enters the MM contra information (e.g., acronym, size), and submits the trade as a floor trade report (FTR) from PAR. The order's submitter receives an execution report (over FIX 270). The execution prints to tape on OPRA 260. The market makers identified as contras are then issued trade notifications (MMTN) over FIX 270 drop.

MM 206 respond to the trade notification with trade confirmations (as a MM 206 trade reports via FIX 270 (the MM trade confirmation may optionally be automated by the hybrid exchange platform 136). The confirmations trigger clearing to OCC 250. An execution report is then sent to the MM 206 in response to the firm 202. The execution report could also be sent over any eligible drop ports.

In various implementations, the trade flow shown in FIG. 2 can be adjusted based on different trading scenarios enabled by the hybrid exchange platform 136. Examples of such scenarios include MM-to-MM executions, B/D-to-B/D executions, out-of-ratio complex order leg executions, crossing orders on a PAR, MM as first reporter, and Names Later interactions, among others. Such examples of trade executions often involve multiple market makers.

In some instances, a floor trade report may be issued via PAR by B/D 204 on the floor (representing an order or an order leg), or may be reported via FIX by a floor market maker (representing a MM's 206 floor execution, and has no associated order). The trade report will specify the instrument, trade time, price, and size to print for a particular trade.

The trade report will specify the floor acronym of the reporting party and the contra party. As trade reports are received by the hybrid exchange platform, they will be evaluated for a match to previously received. The size of the report is not used to identify a match; a partial match will be paired off and cleared, leaving remaining size on one report remaining to be matched. Floor trade reports will print to tape based on a "broker priority, otherwise first come, first printed" basis. The "no tape" button will need to be used when a broker is trading with another broker using Names Later.

In some instances, printing "unmatched size" means that if a floor trade report can be aligned with an opposite side trade with the same type of trader, that size will not be printed. A collection of "unmatched print size" may be maintained per instrument and per price.

For complex order floor trade reports, the unmatched print size will be tracked per leg instrument. The unmatched print size will be a list of trade report's and their contras. When a floor trade report is received, if it is determined by the above table to print "unmatched size", then as much size as possible will be matched to the "unmatched print size" collection.

An execution report will be issued to the EFID of the order (or market maker firm drop port, in the case of an MM floor trade report) and any eligible drop recipients for each floor trade report received. The execution report will not report the contra information a 'dummy' contra firm may be used if the tag/field cannot simply be absent. An execution report will not be issued upon receipt of a Names Later trade report from the floor. An execution report will be issued for the order when a Names Later endorsement floor trade report is received since the execution report for the order was sent at the time the original Names Later floor trade report was processed.

If floor broker (executing broker) firm has been configured with a floor broker drop port, a drop copy of the execution will be delivered to that port. ME 230 will increase the traded size of the order by the size reported on the floor trade report. If the floor trade report is for a leg of a complex order, increase the traded size of the leg. If the floor trade report is for a complex leg and the floor trade report size increased the total in-ratio traded size of the complex order, then an execution report for the complex order ("package") will be issued for that difference in traded size. An execution ID will be generated for the complex order fill.

i. Exchange Participants

Figure 3:
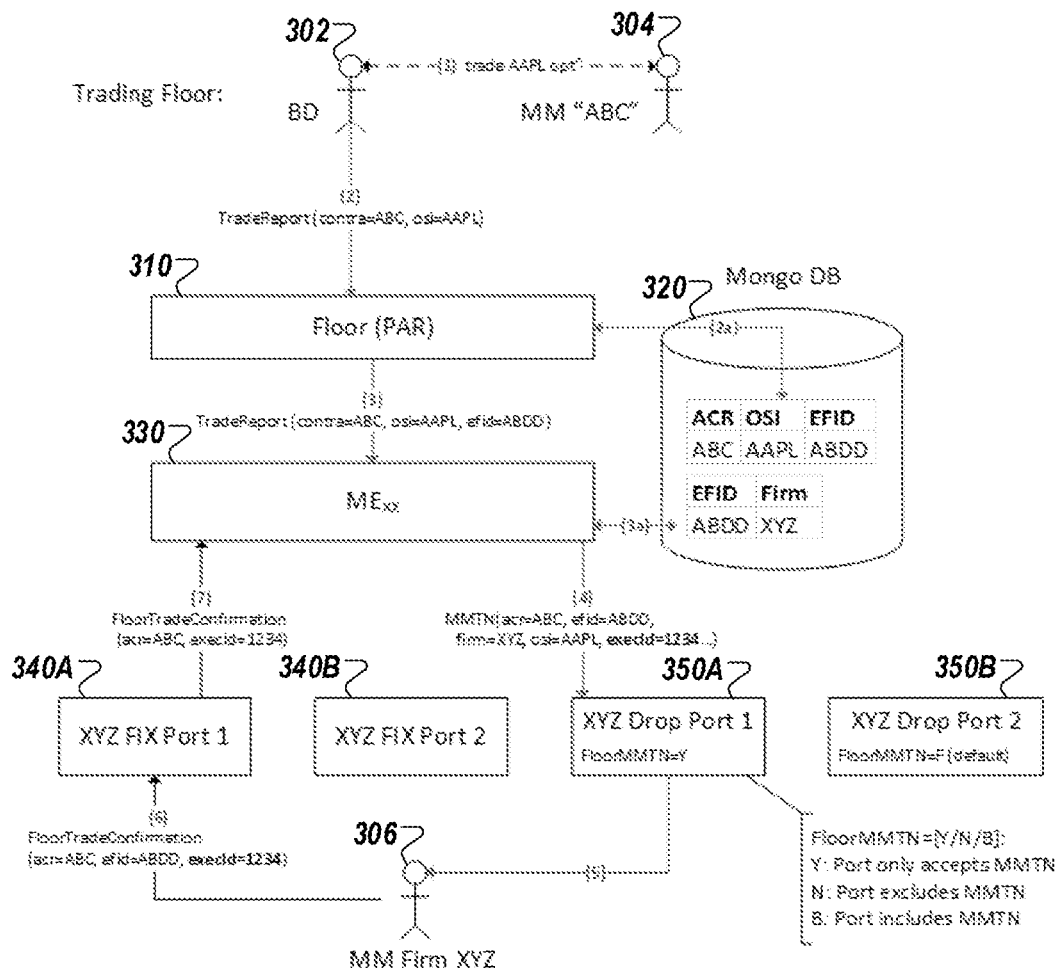
FIG. 3 is a diagram of an example of a floor market participant notification and confirmation sequence of the hybrid exchange platform.

FIG. 3 is a diagram of an example of a floor market participant notification and confirmation sequence of the hybrid exchange platform. In general, if the contra party of a floor trade report is a market maker, a FIX message, Market Maker Trade Notification (MMTN) is sent to the Market Maker's firm over FIX Drop ports. This will notify them that they have been identified as a contra on a floor trade report.

The MMTN is available via FIX and not BOE. The MMTN will be sent to the Market Maker's firm over their Fix Drop ports. A port parameter is configured to allow a firm to receive MMTNs. The MMT is an execution report having "ExecType=T" and will identify the instrument, time of trade on the floor, price of the execution, executing broker, and the floor trade report clearing house. The market making firm sends a FTR in response to the MMTN if they do not have automatic endorsement enabled and if they have not already submitted a floor trade report for this trade.

In the example shown in FIG. 3, BD 302 and MM 304 initiate a floor trade of AAPL options on the trading floor. A trade report (which identifies MM as the contra party of the floor trade and the instrument as AAPL) is then sent to PAR 310. Information specified in the trade report is then used to access relevant information from database 320. This information includes EFID and a firm associated with the EFID.

The trade report is updated to include the EFID identified from database 320 and the updated trade report is sent to ME 330. ME 330 provides a floor trade confirmation (identifying the MM 304 and an execution ID) to MM firm 306 via FIX port 340A (FIX port 340B is also available). ME 330 also provides a MMTN to MM firm 306 via drop port 350A (over drop port 350B).

In some implementations, automatic endorsement of market marker floor trade reports is provided. MM 304 may be configured in CRM to auto-endorse floor executions. In such cases, the MMTN will still be issued.

The database records within database 320 for floor transactions allow for separate records between printing, execution, and matching. Trade match records are recorded in a new database table, and reflect the current state of the floor matching records. This can be used by OSC/TD staff to monitor and manage unmatched trades. Order transition records for floor executions are marked appropriately to indicate if they are reporting execution, matched for clearing, or resulted in a trade print. One transaction could trigger any combination of the above actions. Order transition records for market maker floor trade reports will require a synthesized order ID. Order transition records for all floor trade reports will indicate the Floor Acronym reporting the event j. Floor Broker Interaction with Books and Markets When a floor broker sends an order to interact with the electronic books and/or away exchange markets, floor systems temporarily transfer control of some of the order size to the hybrid exchange platform 136. Any size remaining after processing of the request is complete will be returned to the floor. Cancel requests received by the ME while the order is temporarily with the ME will be routed to the floor. If 0 size remaining on order, cancel is not sent to floor; it is TLTC. During Sweep/COA, cancel sent after the sweep/COA in progress. Risk bookkeeping (net positions, etc.) of the routed order will not be considered. Self-trade prevention will not be applied when executing in the ME. If a "bundle" (logical group of orders with the same terms) is routed by the PAR to the book, they will be routed one-by-one by floor systems and can be considered as independent operations by the ME.

When floor orders are routed for execution, customer priority allocation is applied, overlaying the configured allocation method. The allocation method is price/time allocation among customer size. Only the displayed size of reserve orders execute with the order (unless trading past this price). Customer all-or-none (AON) orders are be included in the customer priority overlay. Floor systems send the order to execute in the local book at the top of book price (the best price having non-AON size since AON may be in the book at a more aggressive price than the top of book best bid offer). Trade with book (T/B) trades only customer at top of book, and trade with all (T/A) trade all available size at the top of book.

The order from the floor includes execution instructions limiting the "T/A" or "T/B" request to a particular price and size (which should not violate the order's pricing and available size). The size parameter is used since the broker may have reduced the size of the order 'ticket'—a change to order size the broker is working, possibly less than the available size of the order. If the best bid offer (BBO) is less aggressive than the away best bid offer (ABBO), then the "T/A" or "T/B" request is returned unexecuted. The T/B order trades at the specified price. The T/B request is returned to the floor if trading with the BBO price does not match the requested execution price. The order is returned with an appropriate reason code. "T/A" and "T/B" executes using customer priority as per The "T/A" executes any non-customer size available at the price level.

The ME rejects/returns the order back to floor systems if the execution cannot be processed for any reason (e.g., market conditions, NBBO, trading hours). Zero or more matches may be executed and execution reports are delivered to all parties EFID port, drops, the executing broker's drop, and the contra parties. Any remaining size will be returned with the order to floor systems. A leg of a complex order can be traded as a simple T/A (referred to on the Floor as a leg "Trade and Return" operation).

Floor systems send am order to the ME to sweep local and away markets, and include an execution price limit, a size limit, and applicable ABBO and BBO market quotes. The ABBO and BBO supplied by the floor is for audit purposes and all trading and routing is based on current markets known by the ME. The type of Sweep that is supported is referred to as "Sweep and Return." This sweep instructs the ME to trade using a price/time customer priority overlay on the configured default allocation algorithm at prices better than the execution limit instruction. Before trading with the book at prices through another exchange, the order will route to that exchange at their displayed price. The order will route no more than the size displayed by the other exchange. Contracts returned unexecuted from away markets will be returned to PAR.

When regular trading hours end, there may be trades in progress on the floor. Floor systems will allow for new trading from being initiated, and trades already started may still be endorsed and reported past the end of regular trading hours. The end of trading on the floor is a determination made daily by the trade desk. Prior to the end of trading on the floor, orders handlers are not shut down. Orders with floor routing instructions continue to be accepted until the trade desk concludes the floor trading for the day. The ME routes to floor if possible.

By the end of day, "Good 'Til Cancelled" (GTC) orders routed to the floor will have their persistent state updated to indicate the location of the order (i.e., at which PAR the order is located). An "end of regular hours" message is sent to the floor systems, which then cancel all day orders which do not have a persistent state. Cancellation of day orders at the end of the day by the ME generates cancel requests to the PAR for any orders on the PAR.

C. Firm Membership a. Permits

Market participants of the hybrid exchange platform 136 are issued permits at the firm level. A Market Maker Electronic Access Permit (MM EAP) is issued to market making firms (a single permit for the firm). A MM EAP will provide the ability for a market making firm to take Tier appointments and permits both electronic and floor access.

A Order Flow Provider Electronic Access Permit is issued to order flow providing firms for sending orders on the hybrid exchange platform 136. A Floor Market Maker Permit (Floor MM) is issued to a market making firm and allows the firm to provide floor access to an individual market making firm. The Floor MM permit provides access to the entire trading floor and permits provide both electronic and floor access.

A Floor Broker Permit is issued to a floor brokerage firm and allows the permit holder to provide floor access to an individual broker. The permit provides access to the entire trading floor and permits provide electronic access in addition to floor access. A Clearing Firm Permit is required for a clearing firm that does not have an OFP EAP. A Parking Permit allows a Floor MM or Floor Broker to stay in the system while inactive. Brokers will be treated as though they are on a parking spot when they are inactive.

b. Floor Market Maker Access

The structure that is currently in place to support electronic access will be supplemented to support floor access. A Floor Market Maker Permit will be required for any market maker choosing to trade on the floor. Market Makers can be a nominee of a firm in which case the permit will be owned by the firm, or sole proprietors, in which case the permit is owned by that individual and can only be used by that individual. If the permit is owned by the firm it can be used by any market maker in the firm at any given time. All active market makers are assigned to a permits. All inactive market makers are assigned to Parking Spots. A Market Maker floor permit will not provide any electronic access. A Floor MM permit will allow trading in all classes on the trading floor. Permit charges will be at the permit level (regardless of the number of market makers that use the permit) and permits that are used for trading in certain classes (e.g., SPX, VIX), and may be charged additional fees based on trading activity.

Each Floor MM permit has application and date requirements similar to those at the firm level. The date monitoring logic between application date, approval date and effective date is applied for each person applying to become a floor market maker.

c. Floor Broker Access

A Floor Broker Permit is issued to any broker choosing to trade on the floor. Floor Brokers can either be a FB Nominee of a firm (in which case the permit will be owned by the firm) or sole proprietors (in which case the permit is owned by that individual and can only be used by that individual). If the permit is owned by the firm it can be used by any broker in the firm at any given time. All active brokers are assigned to a permits. All inactive brokers are assigned to Parking Spots. A Floor Broker permit will not provide any electronic access. A Floor Broker permit will allow trading in all classes on the trading floor. All permit charges will be at the permit level regardless of the number of floor brokers that use the permit in any given month☐ and permits that are used for trading in certain classes (e.g., SPX, VIX), may be charged additional fees based on trading activity. is a billing requirement but is noted here for informational purposes. Each floor broker permit has application and date requirements similar to those at the firm level.

d. Inactive Status

Approved Floor members who are not on a permit at any given time will be considered inactive. The firm can move individual market makers or floor brokers on and off floor permits at any time, including intra-day, so these changes must be transmitted to the trading systems immediately so that the person moved on to the permit can trade while the person moved off of the permit may not. Floor trades will not be accepted if a MM or FB acronym is not known to the system. Firms are charged a fee for maintaining inactive members as well as for switches on and off the permit.

D. Exchange Websites

The hybrid exchange platform 136 can be configured to be published on one or more website domains to permit remote access to trading capabilities and resources by market participants. Examples include websites for the market and exchange, tools and resources, quotes and data, legal and regulation, systems, and trading. Dedicated websites also allow Trade Permit Holders (TPHs) with access liquidity providers, forms library, market interfaces, among other resources. Other webpages provide technology integration status to customer and vendors keeping them up-to-date on integration plans and allowing them to plan for subsequent software migrations.

E. Transaction Orders a. Simple Orders

For simple orders, base matching algorithms are set on an OSI Root level and settings are applied to both Regular and Global Trading Hours. Price-time allocation refers to orders being allocated to trade based on the best price first. When multiple orders are at a given price, orders are executed in time order, based on the time they were booked. Modifications to orders may or may not cause the "time" considered in price-time priority to be updated.

Orders where price is changed cause time priority to be updated. This includes price moving up and down. Orders cannot move back in price and keep priority. Orders where the quantity of the order is increased cause the priority to be updated. This includes increasing the reserve/hidden portion of the order, not just the displayed portion. Orders where the quantity of the order is decreased will not cause the priority to be updated. In some instances, a sequence of price-time allocation is conducted at each price level starting with the best price, then displayed orders, hidden portion of reserve orders, and then all-or-none orders.

Overlays may impact allocation requirements within Price-Time allocations. Overlays are configurable by OSI root but apply across regular and global trading hours. An OSI Root can have multiple overlays enabled at the same time. Overlays where a percentage entitlement is provided is applied when there is more available quantity at that price than the incoming order's size.

Orders that have a percentage of their size allocated as part of an overlay are considered for additional allocation in the normal price-time algorithm. The order would be include overlay allocations and a price-time allocation based on order's price-time priority, regardless of whether it did or did not receive an overlay allocation.

Different overlays are available when the base algorithm is set to Price-Time. One example is a price-time customer priority overlay. When the customer priority overlay is enabled for an underlying that is trading in a price-time market, any customer at the same price level of a trade is executed first at that price level. When more than one customer order is at that price, customer orders will be executed in price-time. When the overlay is enabled, all other overlays that provide allocation entitlements will be based on the remaining quantity after all customers at the price have executed. If the customer priority overlay is not enabled, the other overlay entitlement calculations will be based on the order's original quantity.

Another example is a designated primary market maker (DPM) overlay. The DPM overlay provides an entitlement to the market maker that is classified as the DPM for the OSI Root. One DPM is configured per OSI Root. Yet another example is a price-time preferenced market maker (pref. MM) overlay. The Pref. MM overlay provides an entitlement to a market maker that is preferenced on the incoming order as opposed to the DPM.

The hybrid exchange platform 136 can provide other features relating to orders. For instance, the hybrid exchange platform 136 can provide an automated improvement mechanism (AIM) for double-sided auctions/crossing orders. Options consolidators compete for their client flow by offering price improvement over current market prices. An auction mechanism allows a consolidator to facilitate price improvement for client flow by internalizing it with its own liquidity at or better than the displayed market prices. By SEC rule, before trading with your own liquidity, it is necessary to expose the order on the hybrid exchange platform 136 so other liquidity providers are given an opportunity to either price improve or participate in the internalization process. Many exchanges offer their members the opportunity to facilitate trades with their customers by using two-sided auction orders. These two-sided auction orders are broadcast to encourage other members to participate. The order originator can be rewarded an execution entitlement (percentage of the order) for bringing the order to the exchange.

As another example, the hybrid exchange platform 136 provides a solicitation auction mechanism (SAM). SAM can be used by inter dealer brokers or bulge bracket firms to solicit liquidity for large blocks. An institution or hedge fund generally will not send an order directly to an exchange to avoid slippage or market impact. The liquidity for large blocks is solicited outside the exchanges and once two sides are committed to trade, both sides of the trade are brought to the exchange for execution. Members can be required to expose an unsolicited agency order to the market for price improvement before crossing it against an order that has been solicited from other broker dealers. SAM can allow an entering member to satisfy this exposure requirement by pairing an unsolicited order with one or more solicited orders and exposing the order for price improvement. The order will either execute or cancel at the conclusion of the auction. If the SAM order trades, trades will either occur against the Initiating Member and the provided contras or against the book and responses. If trading against the book and responses, the IM's original contra side order will be cancelled. Essentially, the initiating contra side of the SAM is treated as AON.

The hybrid exchange platform 136 also enables qualified contingent cross (QCC). QCC represents an order that includes an initiating order to buy (sell) at least 1,000 contracts that is identified as being part of a Qualified Contingent Trade (QCT), coupled with a contra-side order or orders totaling an equal number of contracts. This crossing order can execute upon arrival without exposure. The order is part of a multi-leg strategy that involves both an option leg and a stock component. The option trades at the prevailing rate in the standard tick on an options exchange. The equity leg, traded at another trading venue, trades taking advantage of the QCT exemption at a price that allows the combined order to achieve the desired net price for the combined transaction.

Other types of orders/features are contemplated. A Sweep AIM, for example, is an order that is entered through the two-side order message which is the same as AIM, SAM, QCC use. Sweep and AIM can be marked as a new auction type on entry to denote the difference between it and a normal AIM auction. Order entry requirements for AIM can apply to Sweep and AIM. This includes the on/off configurability by trading hours and OSI Root. If AIM is turned off for a session/OSI Root, Sweep and AIM is turned off. Sweep and AIM orders where both sides have the capacity of Customer are rejected. Members that submit customer to customer orders can also leverage the AIM mechanism.

b. Complex Orders

The hybrid exchange platform 136 also provides enhancements to complex orders through a Complex Book. The Complex Book has the ability to be configurable by class in either Price/Time or Pro Rata regardless of the Simple Book priority method. If an instrument is created across two or more different classes (e.g., SPX/SPXW) that are configured with different priority methods, the system can default to Pro Rata. customer priority is configurable by class and can be applied to both Pro Rata and Price/Time priority methods. If an instrument is created across two or more different classes that are configured differently for customer priority, the system will default to enforcing customer priority.

In some instances, the Complex Book priority is initially given to Displayed Priority Customer Simple Book Orders (Multi-Listed Only), followed up Displayed Non-Customer Simple Book Orders, Reserve Simple Book Orders, AON Simple Book Orders, Displayed Priority Customer Complex Book Orders (Multi-Listed Only), Displayed Non-Customer Complex Book Orders and COA Responses, and Reserve Complex Book Orders. In other instances, high level priority includes Displayed Priority Customer Simple Book Orders, then All Orders on Complex Book, followed by All Remaining Orders on Simple Book. In some other instances, detailed priority is given to Displayed Priority Customer Simple Book Orders, Displayed Priority Customer Complex Orders (Multi-Listed Only), Displayed Non-Customer Complex Book Orders and COA Reponses, Displayed Non-Customer Simple Book Orders, Reserve Priority Customer Simple Book Orders (Multi-Listed Only), Reserve Non-Customer Simple Book Orders, AON Priority Customer Simple Book Orders (Multi-Listed Only), and AON Non-Customer Simple Book Orders.

F. Additional Features a. Operational/Customer Tooling

The hybrid exchange platform 136 can provide various operational tools that to assist market participants in trading-related activities. For example, an options underlying symbol management provides the ability to see and update invalid OSI Root/Underlying Mappings that have been flagged. This tool also allows updates to OSI Root information such as Tick Type and Multiplier, updates to Designated Primary Market-Maker (DPM) configurations, and the ability to see underlying symbol information across environments, edit information as needed and/or sync information with the equities table.

Port management allows the trade desk to create ports and update port settings based on requests and approvals. This tool also provides the ability to search for and update symbol level attributes, such as Active, Test, and Closing Only.

The Trade review tool provides authorized internal users the ability to conduct trade reviews and enact busts/adjusts as needed. This includes mutual bust/adjusts that are sent in via the member portal from market participants. The tool also provides the ability to tear down equity legs in the system.

The Cancel orders tool is available to internal staff for Options markets and allows order cancellation orders by Order ID (multiple allowed), Port Owner, On Behalf Of, MPID (Firm), and additional filters.

The order lookup tool allows internal and external users to search for orders based on certain criteria.

The option product configuration is an internal tool/webpage that provides view only access to the current production (and cert) environment's product/symbol table configuration. A table can store all OSI root level configurations.

b. FLEX Options

FLEX can trade on any certified underlying product (equity, ETF, Index). The product does not have to be listed on any other option exchange (standalone FLEX). FLEX products are defined by a set of attributes that include the underlying instrument, the exercise style and the settlement style. FLEX OSI Root names use a numeric to identify Settlement/Exercise combinations along with underlying product symbol. FLEX can only trade if there is a defined settlement value.

c. Market Data Dissemination

The hybrid exchange platform 136 can disseminate market data internally using floor systems, and also for distribution externally to Member Firms (TPHs), data vendors/extranets, and other market data consumers downstream resulting in analysis, decision-making, and potential additional trading of financial instruments (simple and complex). Market Data can be disseminated through CSM, and made available via CSM market data feeds, such as BBO, Book Depth, and Complex Order Book (COB). Exchange data can be delivered through a number of different market data products, or feeds.

G. Example

FIG. 4 is a flowchart of an example process for implementing a hybrid exchange platform. Briefly, the process 400 includes establishing a secure connection with each of a plurality of market participants (410), receiving a transaction order for a financial instrument (420), identifying a market participant to which the transaction order is to be routed (430), routing the transaction order to the market participant (440), receiving information that one or more in-crowd market participants accepted the transaction order (450), and facilitating the transaction order (460).

In more detail, the process 400 includes establishing a secure connection with each of a plurality of market participants (410). For example, the exchange computer system 110 can establish a secure connection with computing devices of market participants or brokers. The secure connection can be made by implementing security protocols and measures such that data identifying order or bid information, or parties placing orders or quotes, can be securely transmitted. For example, the secure connection can established using VPNs. A particular market participant may, for example, access the hybrid exchange platform 136 through a client application running on a computing device, such as client application 240 running on computer 210.

The process 400 includes receiving transaction order for a financial instrument (420). For example, the exchange computer system 110 can receive information relating to a financial instrument transaction order a connected user device of an exchange participant. The information can identify, for example, order or bid information, parties placing orders or quotes, or risk information. The participant may, for example, provide the information to the exchange computer system 110 through a user interface associated with the hybrid exchange platform 136. The information can also include a routing instruction for routing the transaction order to a trading floor.

The process 400 includes identifying a market participant to which the transaction order is to be routed (430). For example, the exchange computer system 110 may identify brokers/dealers on the trading floor associated with the hybrid exchange platform 136 and to which the transaction order should be routed. As discussed throughout, brokers/dealers and market makers may engage in open outcry trading on the trading floor.

The process 400 includes routing the transaction order to the market participant (440). For example, the exchange computer system may route the transaction order to the market participant based on a routing instruction included within the transaction order. The routing instruction (e.g., direct, default, electronic only) can be used to route a transaction order to a trading floor. Direct routing instructs that a transaction order to be directed to an indicated device. Default routing (also referred to as "Electronic First") indicates that electronic execution is preferred, but the order may be routed to the indicated device if it cannot be processed.

The process 400 includes receiving information that one or more in-crowd market participants have accepted the transaction order (450). For example, the exchange computer system may receive a floor trade report (FTR) from a device associated with flor market participant. The exchange computer system then provides an execution report to the submitter of the transaction order.

The process 400 includes facilitating the transaction order based on the information that the one or more in-crowd market participants have accepted the transaction order (460). For example, the exchange computer system 110 can facilitate the transaction order based on the information relating to the financial instrument transaction order, the information that one or more in-crowd market participants have accepted the transaction order, and/or one or more order matching rules.

The exchange computer system 110 may, for example, be a distributed computer system including an order routing system 132, an order matching system 134, and a hybrid exchange platform 136. In such implementations, the order routing system 132 receives the information relating to the financial instrument transaction order and the information relating to the response, and forwards that information to the order matching system 134, and the order matching system 134 facilitates the transaction based on the forwarded information and one or more order matching rules.

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. The term "and/or" is also intended to be construed in this manner.

The use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements.

What is claimed is:

1. A method implemented via an exchange computer system with a hybrid exchange platform that includes an electronic exchange and a trading floor, the method comprising:

establishing a connection from the exchange computer system to at least one device from a plurality of devices associated with the trading floor, wherein each device included in the plurality of devices is associated with in-crowd market participants located on the trading floor;

receiving, from a user device communicatively coupled to the exchange computer system and through an order routing system of the exchange computer system, an order for an asset listed on the hybrid exchange platform and data related to the order, wherein:
the order comprises a routing instruction, wherein the routing instruction comprises routing information indicating that a destination for execution of the order is (i) the trading floor, or (ii) electronic execution by the exchange computer system;
the data related to the order comprises transaction information related to the order, wherein the transaction information related to the order is used to execute the order on the hybrid exchange platform through an order matching system of exchange computer system;
the routing instruction specifies a routing method from among a plurality of routing methods executable by the order routing system; and
the plurality of routing methods comprises at least (i) a first routing method that causes the order to be executed based on the data related to the order and using order matching on the electronic exchange by the order matching system of the exchange computer system, and (ii) a second routing method that causes the order to be executed based the data related to the order on the trading floor and routed to one or more devices included in the plurality of devices;
determining, by the hybrid exchange platform and based on the data related to the order, that the order cannot be executed by the first routing method, wherein the determination is based on a price for the asset of the order and a size of the order;
determining, by the hybrid exchange platform and based on the routing information from the routing instruction, that the order can be executed by the second routing method;
in response to determining that the order can be routed by the second routing method and by the hybrid exchange platform:
identifying, from among the plurality of devices, at least one device to which the order is to be routed, wherein at least one device corresponds to at least one in-crowd market participant from the in-crowd market participants;
generating a floor trade report from the at least one device, wherein the floor trade report comprises reporting information indicating an instrument, trade time, price, and size for printing in a ticker tape of the trading floor;
routing, by the order routing system, the order to the at least one device and the floor trade report to an order book of the exchange computer system;
receiving confirmation that the at least one in-crowd market participant from the in-crowd market participants have accepted the order;
executing, by the order matching system of the exchange computer system, the order based on the confirmation that the one or more in-crowd market participants have accepted the order;
in response to executing the order, identifying contra information of the at least one in-crowd market participant, wherein the contra information indicates a reporting type for executable trades from the at least one device of the at least one in-crowd market participant, wherein the reporting type indicates portions of the contra information that is reportable;
generating, based on the identified contra information, an execution report comprising the portions of the contra information that are reportable to the user device;
determining whether there is a match between the floor trade report and the execution report;
in response to determining that there is a match, clearing the order from the order book of the exchange computer system and the ticker tape of the trading floor; and
providing the execution report to the user device and the ticker tape of the trading floor.

2. The method of claim 1, wherein:
the order routing system is configured to execute the routing instruction;
the first routing method causes the order routing system to route the order to the order matching system; and
the second routing method causes the order routing system to route the order to the hybrid exchange platform.

3. The method of claim 1, wherein:
the second routing method specified by the routing instruction indicates a user preference for executing the order on the order matching system;
the method further comprises determining that the order is unable to be executed on the order matching system; and
the at least one device to which the order is to be routed is identified in response to determining that the order is unable to be processed on the electronic exchange.

4. The method of claim 1, wherein:
the routing instruction further indicates a user preference for executing the order using order matching on the order matching system;
the method further comprises determining that the order is unable to be processed on the order matching system; and
the at least one device to which the order is to be routed is identified in response to determining that the order is unable to be processed on the electronic exchange.

5. The method of claim 1, wherein:
the routing instruction further indicates a user selection of a particular device from among the plurality of devices associated with in-crowd market participants located on the trading floor; and
the particular device to which the order is to be routed is identified based on the user selection indicated by the routing instruction.

6. The method of claim 1, further comprising
receiving an indication that the order has been executed on the trading floor;
generating a reporting message based on receiving the indication that the order has been executed on the trading floor, wherein the reporting message comprises at least a portion of information related to execution of the order; and
providing the reporting message for output on the hybrid exchange platform.

7. An exchange computer system with a hybrid exchange platform that includes an electronic exchange and a trading floor, the exchange computer system comprising:
one or more processors; and
one or more storage devices storing instructions that are operable, when executed by the one or more processors, to cause the one or more processors to perform operations comprising:
establishing a connection from the exchange computer system to at least one device from a plurality of devices associated with the trading floor, wherein each device included in the plurality of devices is associated with in-crowd market participants located on the trading floor;

receiving, from a user device communicatively coupled to the exchange computer system and through an order routing system of the exchange computer system, an order for an asset listed on the hybrid exchange platform and data related to the order, wherein:

the order comprises a routing instruction, wherein the routing instruction comprises routing information indicating that a destination for execution of the order is (i) the trading floor, or (ii) electronic execution by the exchange computer system;

the data related to the order comprises transaction information related to the order, wherein the transaction information related to the order is used to execute the order on the hybrid exchange platform through an order matching system of exchange computer system;

the routing instruction specifies a routing method from among a plurality of routing methods executable by the order routing system; and the plurality of routing methods comprises at least (i) a first routing method that causes the order to be executed based on the data related to the order and using order matching on the electronic exchange by the order matching system of the exchange computer system and (ii) a second routing method that causes the order to be executed based the data related to the order on the trading floor and routed to one or more devices included in the plurality of devices;

determining, by the hybrid exchange platform and based on the data related to the order, that the order cannot be executed by the first routing method, wherein the determination is based on a price for the asset of the order and a size of the order determining, by the hybrid exchange platform and based on the routing information from the routing instruction, that the order can be executed by the second routing method;

in response to determining that the order can be routed by the second routing method and by the hybrid exchange platform:

identifying, from among the plurality of devices, at least one device to which the order is to be routed, wherein at least one device corresponds to at least one in-crowd market participant from the in-crowd market participants;

generating a floor trade report from the at least one device, wherein the floor trade report comprises reporting information indicating an instrument, trade time, price, and size for printing in a ticker tape of the trading floor;

routing, by the order routing system, the order to the at least one device and the floor trade report to an order book of the exchange computer system;

receiving confirmation that the at least one in-crowd market participant from the in-crowd market participants have accepted the order;

executing, by the order matching system of the exchange computer system, the order based on the confirmation that the one or more in-crowd market participants have accepted the order;

in response to executing the order, identifying contra information of the at least one in-crowd market participant, wherein the contra information indicates a reporting type for executable trades from the at least one device of the at least one in-crowd market participant, wherein the reporting type indicates portions of the contra information that is reportable;

generating, based on the identified contra information, an execution report comprising the portions of the contra information that are reportable to the user device;

determining whether there is a match between the floor trade report and the execution report;

in response to determining that there is a match, clearing the order from the order book of the exchange computer system and the ticker tape of the trading floor; and providing the execution report to the user device and the ticker tape of the trading floor.

8. The exchange computer system of claim 7, wherein:
the order routing system is configured to execute the routing instruction;
the first routing method causes the order routing system to route the order to the order matching system; and
the second routing method causes the order routing system to route the order to the hybrid exchange platform.

9. The exchange computer system of claim 7, wherein:
the second routing method specified by the routing instruction indicates a user preference for executing the order using order matching on the order matching system;
the operations further comprise determining that the order is unable to be processed on the order matching system; and
the at least one device to which the order is to be routed is identified in response to determining that the order is unable to be processed on the electronic exchange.

10. The exchange computer system of claim 7, wherein:
the routing instruction further indicates a user preference for executing the order using the order matching system;
the operations further comprise determining that the order is unable to be executed on the order matching system; and
the at least one device to which the order is to be routed is identified in response to determining that the order is unable to be processed on the electronic exchange.

11. The exchange computer system of claim 7, wherein:
the routing instruction further indicates a user selection of a particular device from among the plurality of devices associated with in-crowd market participants located on the trading floor; and
the particular device to which the order is to be routed is identified based on the user selection indicated by the routing instruction.

12. The exchange computer system of claim 7, wherein the operations further comprise:
receiving an indication that the order has been executed on the trading floor;
generating a reporting message based on receiving the indication that the order has been executed on the trading floor, wherein the reporting message comprises at least a portion of information related to execution of the order; and
providing the reporting message for output on the hybrid exchange platform.

13. At least one non-transitory computer-readable storage media storing instructions that are received by one or more processors of an exchange computer system with a hybrid exchange platform that includes an electronic exchange and a trading floor, the instructions causing the one or more processors to perform operations comprising:

establishing a connection from the exchange computer system to at least one device from a plurality of devices associated with the trading floor, wherein each device included in the plurality of devices is associated with in-crowd market participants located on the trading floor;

receiving, from a user device communicatively coupled to the exchange computer system and through an order routing system of the exchange computer system, an order for an asset listed on the hybrid exchange platform and data related to the order, wherein:

the order comprises a routing instruction, wherein the routing instruction comprises routing information indicating that a destination for execution of the order is (i) the trading floor, or (ii) electronic execution by the exchange computer system;

the data related to the order comprises transaction information related to the order, wherein the transaction information related to the order is used to execute the order on the hybrid exchange platform through an order matching system of exchange computer system; the routing instruction specifies a routing method from among a plurality of routing methods executable by the order routing system; and the plurality of routing methods comprises at least (i) a first routing method that causes the order to be executed based on the data related to the order and using order matching on the electronic exchange by the order matching system of the exchange computer system and (ii) a second routing method that causes the order to be executed based on the data related to the order and on the trading floor and routed to one or more devices included in the plurality of devices;

determining, by the hybrid exchange platform and based on the data related to the order, that the order cannot be executed by the first routing method, wherein the determination is based on a price for the asset of the order and a size of the order;

determining, by the hybrid exchange platform and based on the routing information from the routing instruction specifies the second routing method;

in response to determining that the order can be routed by the second routing method and by the hybrid exchange platform:

identifying, from among the plurality of devices, at least one device to which the order is to be routed, wherein at least one device corresponds to at least one in-crowd market participant from the in-crowd market participants;

generating a floor trade report from the at least one device, wherein the floor trade report comprises reporting information indicating an instrument, trade time, price, and size for printing in a ticker tape of the trading floor;

routing, by the order routing system, the order to the at least one device and the floor trade report to an order book of the exchange computer system;

receiving confirmation that the at least one in-crowd market participant from the in-crowd market participants have accepted the order; and executing, by the order matching system of the exchange computer system, the order based on the information that the one or more in-crowd market participants have accepted the order;

in response to executing the order, identifying contra information of the at least one in-crowd market participant, wherein the contra information indicates a reporting type for executable trades from the at least one device of the at least one in-crowd market participant, wherein the reporting type indicates portions of the contra information that is reportable;

generating, based on the identified contra information, an execution report comprising the portions of the contra information that are reportable to the user device;

determining whether there is a match between the floor trade report and the execution report;

in response to determining that there is a match, clearing the order from the order book of the exchange computer system and the ticker tape of the trading floor; and providing the execution report to the user device and the ticker tape of the trading floor.

14. The at least one non-transitory computer-readable storage media of claim 13, wherein:

the order routing system is configured to execute the routing instruction;

the first routing method causes the order routing system to route the order to the order matching system; and the second routing method causes the order routing system to route the order to the hybrid exchange platform.

15. The at least one non-transitory computer-readable storage media of claim 13, wherein:

the second routing method specified by the routing instruction indicates a user preference for executing the order using order matching on the order matching system;

the operations further comprise determining that the order is unable to be processed on the order matching system; and the at least one device to which the order is to be routed is identified in response to determining that the order is unable to be processed on the electronic exchange.

16. The at least one non-transitory computer-readable storage media of claim 13, wherein:

the routing instruction further indicates a user preference for executing the order using the order matching system;

the operations further comprise determining that the order is unable to be executed on the order matching system; and the at least one device to which the order is to be routed is identified in response to determining that the order is unable to be processed on the electronic exchange.

17. The at least one non-transitory computer-readable storage media of claim 3, wherein:

the routing instruction further indicates a user selection of a particular device from among the plurality of devices associated with in-crowd market participants located on the trading floor; and the particular device to which the order is to be routed is identified based on the user selection indicated by the routing instruction.

18. The method of claim 1, wherein establishing the connection with a device in the plurality of devices comprises implementing at least one of (i) a security protocol, (ii) a virtual private network, or (iii) a client application, of the exchange computer system to securely transmit data between the device and the exchange computer system.

19. The method of claim 1, further comprising:
 providing, by the hybrid exchange platform and to at least one device in the plurality of devices, at least one of (i) access to a complex order book of the exchange computer system, (ii) a plurality of operational tools related to the order, (iii) market data related to the asset, or (iv) customizable contracts for the asset.

20. The method of claim 1, wherein the transaction information related to the order comprises at least one of (i) identification of contra parties, (ii) quotes for the asset, or (ii) risk information for the asset, of the order.

\* \* \* \* \*

UNITED STATES PATENT AND TRADEMARK OFFICE
CERTIFICATE OF CORRECTION

| | | |
|---|---|---|
| PATENT NO. | : 11,995,721 B1 | Page 1 of 1 |
| APPLICATION NO. | : 17/400884 | |
| DATED | : May 28, 2024 | |
| INVENTOR(S) | : Eric Crampton | |

It is certified that error appears in the above-identified patent and that said Letters Patent is hereby corrected as shown below:

In the Claims

Column 24, Line 56, Claim 17, delete "claim 3" and insert therefor -- claim 13 -- and;

Column 25, Line 12, Claim 20, delete "(ii)" and insert -- (iii) --.

Signed and Sealed this
Twenty-second Day of October, 2024

*Katherine Kelly Vidal*

Katherine Kelly Vidal
*Director of the United States Patent and Trademark Office*